(12) United States Patent
Adams

(10) Patent No.: US 7,082,711 B2
(45) Date of Patent: Aug. 1, 2006

(54) FISHING FLOAT

(75) Inventor: Nicholas S. Adams, East Gull Lake, MN (US)

(73) Assignee: Lindy Little Joe, Inc., Brainerd, MN (US)

( * ) Notice: Subject to any disclaimer, the term of this patent is extended or adjusted under 35 U.S.C. 154(b) by 608 days.

(21) Appl. No.: 10/161,582

(22) Filed: May 29, 2002

(65) Prior Publication Data

US 2002/0178645 A1    Dec. 5, 2002

Related U.S. Application Data

(63) Continuation of application No. 09/546,070, filed on Apr. 10, 2000, now abandoned.

(60) Provisional application No. 60/143,714, filed on Jul. 14, 1999.

(51) Int. Cl.
*A01K 75/02* (2006.01)
(52) U.S. Cl. .................................. 43/17.5
(58) Field of Classification Search ............ 43/17.5, 43/44.9, 44.91, 44.94, 44.92, 44.93, 44.95
See application file for complete search history.

(56) References Cited

U.S. PATENT DOCUMENTS

| 862,853 | A | * | 8/1907 | Simmons | 43/44.91 |
| 2,755,589 | A | * | 7/1956 | Osborne | 43/15 |
| 5,119,578 | A | * | 6/1992 | Johnson | 43/17 |
| 5,243,780 | A | | 9/1993 | Christensen | |
| 5,329,722 | A | * | 7/1994 | Wilson | 43/44.94 |
| 5,404,668 | A | | 4/1995 | Christensen | |

FOREIGN PATENT DOCUMENTS

KR    9719167    * 5/1997

OTHER PUBLICATIONS

Blue Fox Tackle Co. Firefly Lighted Float Packaging (front and back), 1995.
Johnson Lures 2000, dated Jul. 1999, Kits and Accessories advertisement.
Johnson's Multi-Function Night Bobber packaging (front and back), dated Jul. 1999.
Tackle Talk International Magazine, dated Sep. 1999, Issue 132, A One Korea Lighted Float Advertisement.
"Statement, photographs and sketches regarding Morning Star float".

* cited by examiner

*Primary Examiner*—Kurt Rowan
(74) *Attorney, Agent, or Firm*—Dorsey & Whitney LLP

(57) ABSTRACT

A combination slip/spring float with the ability to be used as a lighted float and more particularly a lighted center slide float.

15 Claims, 2 Drawing Sheets

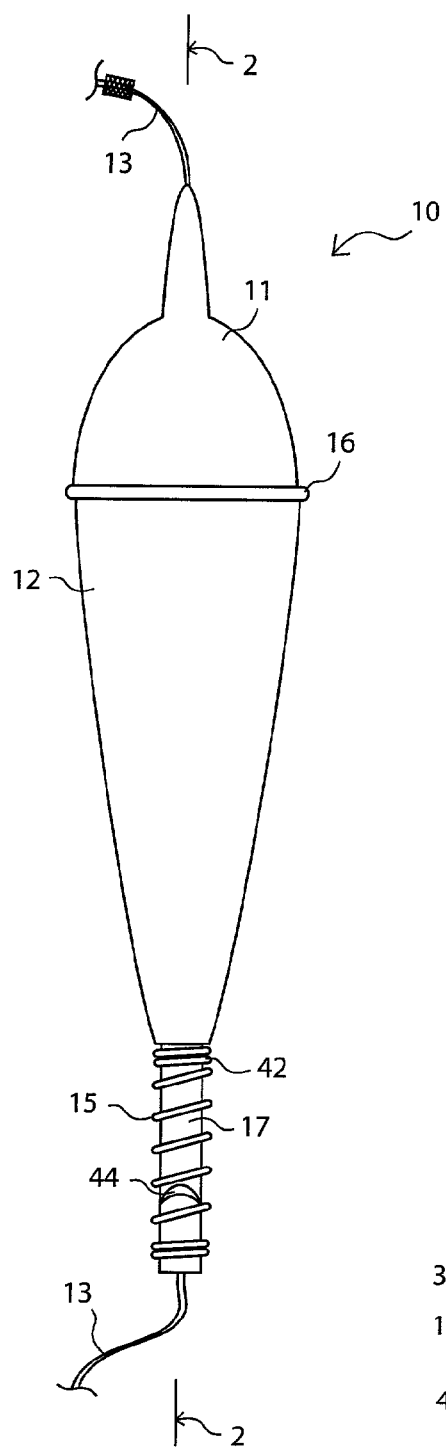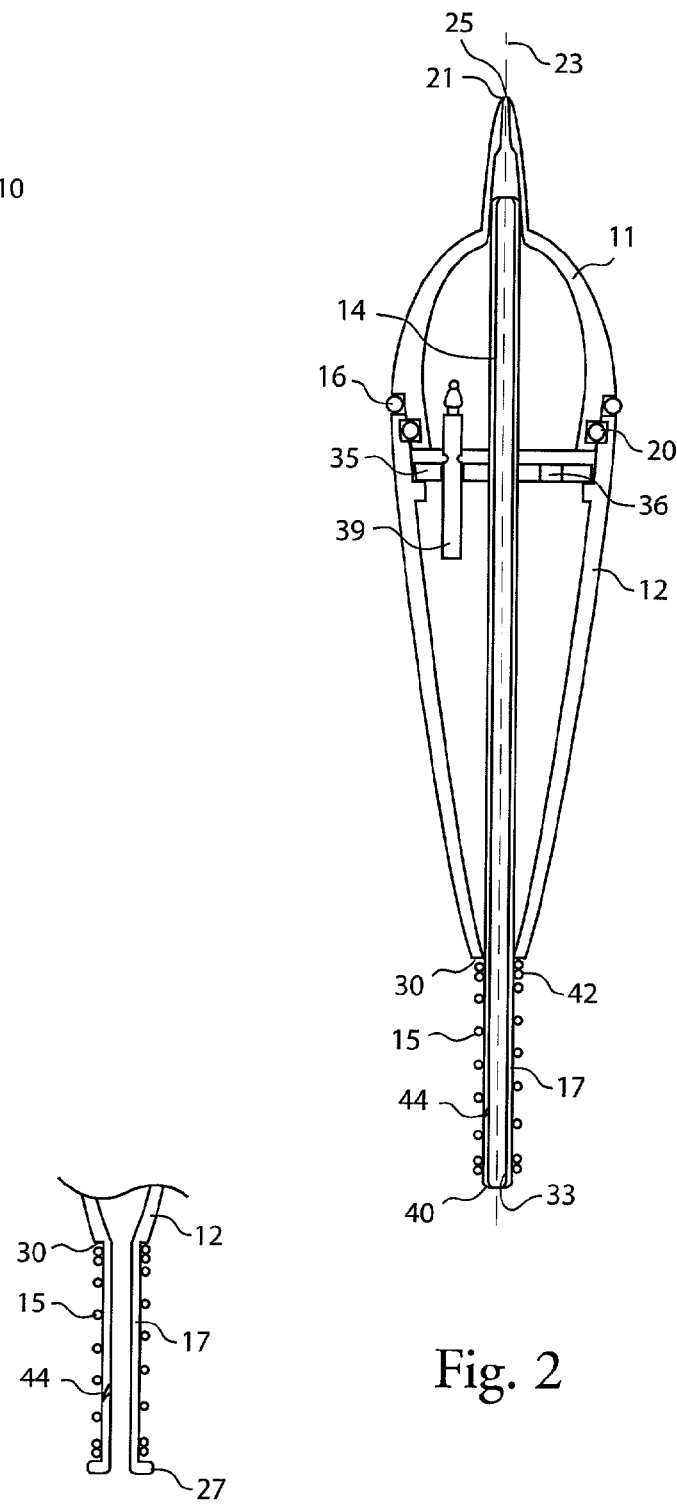
Fig. 1
Fig. 7
Fig. 2

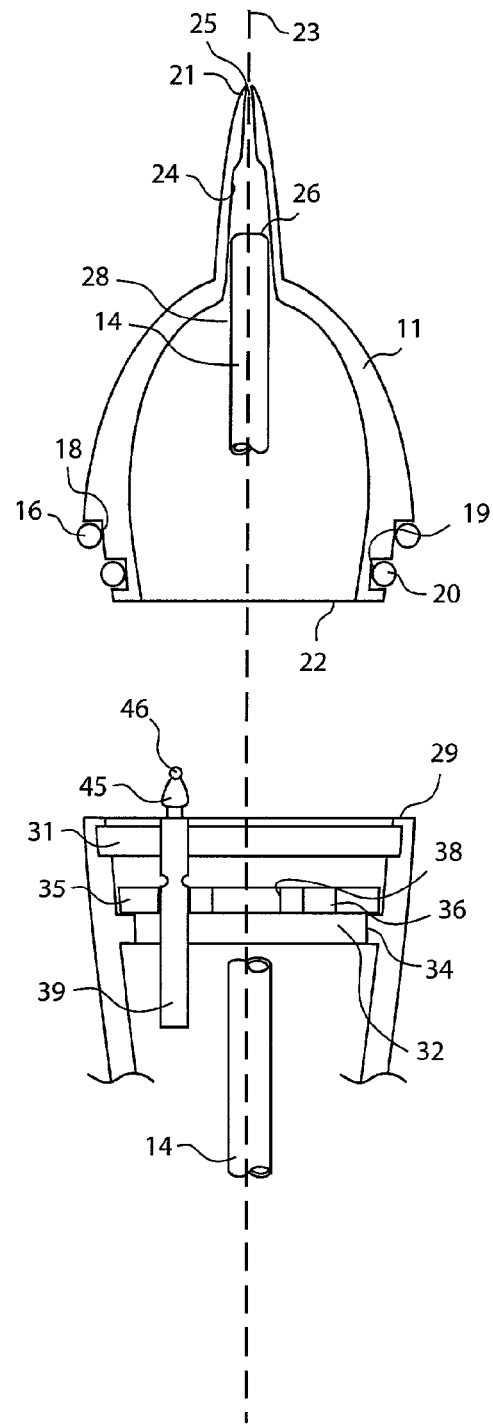
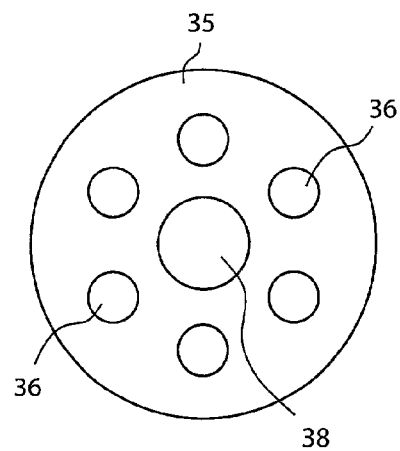
Fig. 4
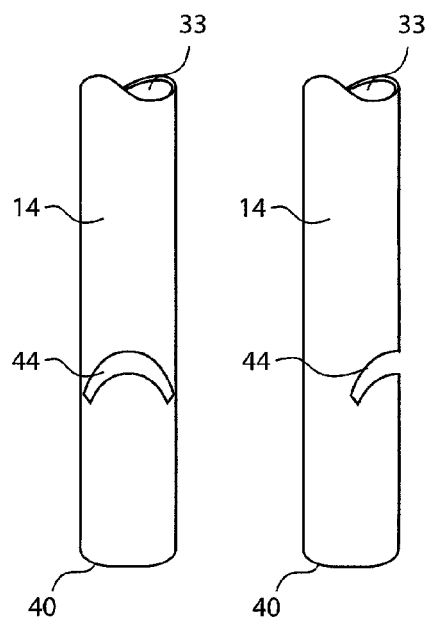
Fig. 3    Fig. 5    Fig. 6

FISHING FLOAT

This application is a continuation of U.S. patent application Ser. No. 09/546,070 filed Apr. 10, 2000, now abandoned which claims the benefit of Provisional Application Ser. No. 60/143,714 filed Jul. 14, 1999.

BACKGROUND OF THE INVENTION

1. Field of the Invention

The present invention relates generally to a fishing float, more particularly to a combination spring/slip float and still more particularly to a lighted center slide fishing float which can be used either as a slip float or a spring float.

2. The Prior Art

A variety of fishing floats are currently available for use in fishing. Some are so called slip floats in which the float is mounted to the fishing line in a manner which enables the line to slide or move relative to the float. A common slip float is a float having a fishing line opening extending from one end (the top) to the other (the bottom) to receive a fishing line along the axial center of the float. Others are so called spring floats in which the float is connected with the fishing line in a relatively fixed position. A common spring float includes a spring support portion with a line receiving slot near the lower end of the float. A coil spring surrounds the support portion to prevent the float from sliding relative to the fishing line.

Further, fishing floats exist which include luminescent members or other lighted means for night fishing. One such lighted float includes a two piece float having selectively connectable upper and lower portions. The upper portion includes a lighted tip carrying a lightable bulb. The upper portion also includes a battery receptacle in which an elongated lithium battery is mounted, in either a lighted operative position or an unlighted storage or inoperative position. In both cases, the lithium battery is mounted along the axial center line of the upper float portion. To change this float from a non-lighted to a lighted mode, the upper float portion is removed from the lower float portion and the battery is manually removed and reinserted in a reverse position into the cylindrical battery receptacle opening along the axial center of the upper float portion. This causes the contacts of the battery to light the bulb in the tip. When it is desired for the light to be turned off, the battery again is manually removed and reversed. Although such float functions as a lighted float for night fishing, it cannot be made to function as a center slide slip/spring float because of the existence of the bulb and the battery positioned along the axial center of the float.

Although a variety of such fishing floats currently exist, there is need for a combination slip/spring float and an improved lighted fishing float for nighttime fishing. The need also exists for a lighted fishing float which can be used both as a slip float and a spring float, and particularly a center slide float.

SUMMARY OF THE INVENTION

The present invention relates to a fishing float which can be selectively used as a lighted fishing float. The fishing float in accordance with the present invention can also be utilized both as a slip float and as a spring float as well as a center slide lighted float.

More specifically, the float of the present invention includes a two-part float structure comprising upper and lower float portions which are retained relative to one another in a relatively sealed condition via a press fit or other connecting means. Preferably the retaining means utilizes one or more O-rings. Extending from one end of the float is a hollow, tubular center stem or spring mounting section. This section may be integrally formed with the bottom end of the lower float portion, but preferably comprises the lower end portion of a main center stem which extends upwardly from the bottom of the lower float portion so that its upper end mates or nests with a portion of the upper end of the float. A mounting member is positioned within the lower float portion for mounting and/or stabilizing the central stem or tube and for mounting a light means. The spring mounting section extending outwardly from the float is provided with a compressible spring member which, in combination with a slit or opening in such section, enables the float to function as a spring float.

Accordingly, it is an object of the present invention to provide an improved, lighted fishing float. A further object of the present invention is to provide a fishing float which can be used either as a slip float or as a spring float.

A further object of the present invention is to provide a combination center slide slip/spring float.

A still further object of the present invention is to provide a multiple use fishing float which can be selectively used as a lighted float for night fishing and as a slip or spring float.

Another object of the present invention is to provide a lighted, center slide float as well as a center slide slip/spring float.

These and other objects of the present invention will become apparent with reference to the drawings and the description of the preferred embodiment.

DESCRIPTION OF THE DRAWINGS

FIG. 1 is an elevational front view of a fishing float in accordance with the present invention.

FIG. 2 is a view, partially in section, of the fishing float of the present invention as viewed along the section line 2,2 of FIG. 1.

FIG. 3 is an enlarged sectional view, partially exploded, showing the connection detail between the upper and lower portions of the fishing float.

FIG. 4 is an elevational plan view of the light member holding member in the float of the present invention.

FIG. 5 is an elevational front view of the distal end of the central stem, without the spring.

FIG. 6 is an elevational side view of the central stem without the spring.

FIG. 7 is an alternate embodiment for a spring mounting section.

DESCRIPTION OF THE PREFERRED EMBODIMENT

The present invention relates to a fishing float, and more particularly a fishing float which can be used as a lighted fishing float 10 for night fishing or can be used either as a slip float or as a spring float. Still further, the invention relates to a center slide slip/spring fishing float. The structure of the float of the present invention is illustrated best with reference to FIGS. 1, 2 and 3.

In general, the fishing float 10 includes an upper float portion 1, a lower float portion 12, a central hollow tube or stem 14, a spring mounting section 17, a spring 15 mounted near the distal end of the mounting section 17 and one or more rubber O-rings 16 and 20 forming a seal between the upper portion 11 and the lower portion 12. As shown more specifically in FIGS. 2 and 3, the upper float portion 11 includes a top end 21 and a bottom end 22. The outer surface of the portion 11 near the end 22 includes a seat or shoulder portion 18 against which the O-ring 16 is disposed. Such outer surface also includes a second O-ring groove or seat 19 for supporting the O-ring 20. Both the shoulder 18 as well as the groove 19 are circumferential elements which extend entirely around the generally circular cross-sectional configuration of the portion 11.

The upper end 21 of the float portion includes a fishing line opening 25 through which a fishing line 13 (FIG. 1) can be threaded when the float is desired to be used as a slip float. Such opening 25 is positioned along the axial center line 23 of the upper portion 11. An inner surface 24 diverges outwardly as it extends downwardly from the opening 25 to define a center stem receiving portion. As shown, the diameter of this surface 24 approximates the outer dimension of the stem 14 so that the upper end of the stem 14 extends into the area defined by the surface 24 in a friction fit. In the preferred embodiment, the upper edge 26 of the central stem 14 is beveled to provide a lead-in to the surface 24. Similar to the opening 25, the area 24 is symmetrical along the axial center line 23 of the float and the upper portion 11.

As shown, the upper 11 and lower 12 portions are selectively connectable to one another. When connected, they define a substantially hollow central float potion. The lower portion 12 of the float includes an upper end 29 and a lower end 30 (FIG. 2). As shown best in FIGS. 2 and 3, the internal surface of the lower portion 12 near the top end 29 is provided with an O-ring retaining seat or groove 31. This groove 31 extends circumferentially around the entirety of the inner surface of the portion 12 and is designed to mate with and receive an outer portion of the O-ring 20 when the float is assembled. The top end 29 of the portion 12 is a generally flat surface which is designed for sealing engagement with a portion of the O-ring 16 when the float is assembled. The upper and lower float portions 11 and 12 are preferably made of buoyant plastic, with at least the upper portion 11 being of translucent plastic to allow the light from the light element 39 hereafter described to shine through.

A circumferential shoulder or mounting member 32 is integrally formed with the inner surface of the portion 12 and extends circumferentially around the entirety of the portion 12. The shoulder 32 includes an upper surface 34 for supporting a centrally positioned member 35 which functions to stabilize the stem 14 and mount a light element 39. As shown best in FIGS. 3 and 4, the member 35 includes a central opening 38 for mounting and stabilizing the central stem 14 and a plurality of battery or light mounting openings 36 positioned radially outwardly and circumferentially around the central opening 38. In the preferred embodiment, the member 35 is shown as a generally circular disc-shaped element; however, members of various other shapes could be used as well provided that they perform the functions of stabilizing the central stem 14 and mounting the light or battery element 39.

When assembled, the outer peripheral lower edge of the member 35 is supported on the support surface 34 of the shoulder 32. If desired, the member 35 can be secured relative to the portion 12 by an adhesive or by a press fit, although such securement is not considered necessary.

As shown best in FIG. 2, the stem 14 is comprised of an elongated hollow tubular member having an upper end 28 which is designed for a friction fit within the surface 24 of the portion 11 when assembled and a lower distal end 40. When the float is assembled, a portion of the central stem 14 preferably extends from the lower end 30 of the float, through the opening 38 in the member 35 and then to the friction fit surface 24. In the preferred embodiment, the central stem 14 is fixed to the lower end of the lower float portion 12 along the axial center line 23. Thus, the hollow stem 14 functions as a fishing line opening at the bottom of the portion 12. If desired, the stem 14 could be fixed to the upper portion 11 along its axial center 23. In either case, the stem 14 preferably extends through the center of the disc 35 or other battery or light mounting member.

The spring mounting or support section 17 of the central stem 14 extends downwardly from the lower end 30 to the distal end 40. A compression spring member 15 is positioned around the lower end of this spring mounting section or support portion 17 as shown. In the preferred embodiment, the upper strand or two of the spring 15 may be secured to the outer surface of the portion 17 at the point 42 by an adhesive. This retains the spring 15 relative to the portion 17 and enables the lower end of the spring 15 to be compressed upwardly when desired. Alternatively, the spring support portion 17 extending downwardly from the lower end 30 can be integrally formed or molded with the portion 12 as shown in FIG. 7. Further, the spring 15 can be secured to this portion 17 at either end. Alternatively, the distal end 40 of the stem or spring support portion 17 could be provided with an enlarged portion 27 (FIG. 7) or other means for capturing and retaining the spring 15. With this structure, the adhesive for the spring 15 can be eliminated.

The section 17 is hollow and thus includes an elongated fishing line opening 33 extending through the entire length and along the axial center 23. Preferably the section 17 is an extension of the center stem 14, which extends through a substantial portion (from bottom to top or vice versa) of the float, and the opening 33 is an extension of the center opening of the stem 14 and the opening 25 at the top of the float. Preferably the stem 14 extends through at least one-third of the float (from top to bottom or vice versa) and more preferably greater than one-half.

Intermediate between the distal end 40 and the lower end 30, the spring support portion 17 (or lower end of the stem 14) is provided with a fishing line slot or opening 44. As shown best in FIGS. 5 and 6, this slot 44 is preferably curved or angled to provide a means, in combination with the spring 15, for retaining the fishing line in a relatively fixed position relative to the float when the float is being used as a spring float. The spring 15, which is moveable between an extended position and a compressed position, is positioned to cover the slot 44 in an extended position and to uncover the slot 44 when in a compressed position. As shown in FIG. 2, the slot 44 communicates with the opening 33, however, this is not a requirement.

The float is also preferably provided with the light member 39 for night fishing. In the preferred embodiment, the light member 39 is comprised of an elongated tubular member having a battery/bulb combination in a single element. Specifically, the member 39 includes an upper light or bulb portion 46 and a portion 45 which is moveable inwardly and outwardly relative to the main portion of the lighted member 39 between an on and an off position. When in an on position, the bulb 46 is lit, while in an off position, the bulb 46 is not lit. The lighted member 39 is retained in a friction fit position within one of the light mounting openings 36. Preferably, the light element 39 is a combination battery/bulb (with a lithium battery) which is manually activated.

The lighted float of the present invention includes upper and lower float portions designed to be selectively connected and disconnected from one another. A retaining disc or other structure is mounted in the lower float portion for mounting one or more battery or light elements 39. The preferred embodiment discloses this structure in the form of a disc 35 with one or more battery/light mounting elements. In the preferred embodiment, these battery/light mounting elements comprise a plurality of holes 36 to mount the battery/light elements 39 off center. The battery/light mounting structure also preferably includes a center opening 38 for receiving the center stem 14. The center stem 14 functions primarily to guide the fishing line from the opening 25 at the top of the float, through the center portion of the float and out through the opening at the bottom end 30 of the float. Thus, when assembled, the center stem must at least be positioned in the central portion of the float to guide the fishing line past the structure for retaining the battery/light units 39. Preferably, the center stem is aligned with the opening 25 at the top of the float and extends along the center line 23 of the float.

It is understood that the disc 35 or other battery/light mounting structure could be mounted in the upper float portion 11 rather than the bottom portion 12. Further, the preferred embodiment shows the center stem 14 mounted in the lower portion 12 and extending into the upper end of the float portion 11 when assembled; however, this could be reversed. Preferably, the stem 14 should extend or pass through the disc 35 or other supporting structure when the float is in its assembled form. Still further, the battery/light mounting elements, such as holes or recesses, could be molded directly into the upper 11 or lower portion 12, if desired.

Having described the structure of the preferred embodiment, the method of assembly and use of the preferred embodiment can be described as follows. First, the O-rings 16 and 20 are mounted to the upper float portion 11 against the shoulder 18 and in the seat 19, respectively. Next, the spring 41 is applied to the lower end of the central stem 14 and secured thereto by an adhesive. The opposite or upper end of the stem 14 is then inserted into the lower end 30 of the float portion 12 and inserted to a preselected extent in which the upper end 28 will seat in a friction fit within the surface 24 when the float portion 11 is applied to the float portion 12. When in this position, the stem 14 is preferably secured in that position relative to the lower float portion 12 if desired. This can be done by applying adhesive between the stem 14 and the lower end 30.

Next, the member 35 is assembled by inserting the free end of the central stem 14 through the opening 38 and moving the member 35 so that it seats against the surface 34 of the shoulder 32. If desired, the member 35 can be secured by an adhesive or the like to the lower float member 12 and/or the central stem 14, if desired. Finally, the light member 39 is inserted into one of the openings 36 and retained therein via a friction fit. The upper float portion 11 is then applied to the lower float portion 12 by inserting the lower end 22 into the open end of the lower portion 12 and manually pressing the two portions together until the O-ring 20 seats in the groove 31. The float is then ready for use as a slip float or a spring float.

To be used as a slip float, the fishing line 13 is threaded through the hollow stem 14 via the opening 25 as shown in FIG. 1. The line 13 is inserted until it exits the bottom end of the float. The float is then free to slip or move along the line 13. To be used as a spring float, the spring 15 is compressed to expose the slot 44. The fishing line is then inserted into the slip 44 and the spring 15 is released. When released, the spring 15 extends over the slot 44 and fishing line and retains the float in a fixed position relative to the fishing line.

If it is desired to also use the float as a lighted float for night fishing, the upper portion 11 is removed and the battery/light element 39 is activated to an on position by pulling up the portion 45. The upper portion 11 is then reinserted into the lower portion 12. In the preferred embodiment, the upper and lower portions 11 and 12 are connected via a friction fit. Thus, the upper portion 11 and the lower portion 12 are separated by manually bending the upper portion back and forth relative to the lower portion 12. However, other connection means such as threads may be provided as well.

Although the description of the preferred embodiment has been quite specific, it is contemplated that various modifications could be made without deviating from the spirit of the present invention. Thus, it is intended that the scope of the present invention is dictated by the appended claims rather than by the description of the preferred embodiment.

The invention claimed is:

1. A combination center slide slip/spring fishing float comprising:
    upper and lower float portions each having an upper end and a lower end, said upper and lower float portions being selectively connectable to one another to define a float with an upper float end and a lower float end;
    a substantially hollow central float interior when said upper and lower float portions are connected with one another and a selectively manually actuatable and removable light member mounted entirely within said hollow float interior;
    a hollow fishing line opening extending through said float from said upper float end to said lower float end when said upper and lower float portions are connected with one another;
    a spring support portion formed at the lower end of said lower float portion for supporting a compressible spring, said hollow fishing line opening extending through said spring support portion;
    a compressible spring mounted on said spring support; and
    a fishing line retaining slot formed in said spring support portion.

2. The fishing float of claim 1 including a light mounting member connected with one of said upper and lower float portions wherein said light member is mountable to said light mounting member.

3. The fishing float of claim 2 wherein said light mounting member includes a mounting disc having a central opening and one or more light receiving openings spaced from said central opening.

4. The fishing float of claim 1 including a mounting disc within said float interior for mounting said light member.

5. The fishing float of claim 4 wherein said mounting disc includes a mounting opening for receiving said light member.

6. The fishing float of claim 1 including a mounting member with a mounting opening for receiving said light member.

7. The fishing float of claim 1 wherein said spring is located at a single position on said spring support and is moveable between a compressed position which permits a fishing line to be inserted into said fishing line retaining slot and an extended position in which said spring extends completely past said fishing line retaining slot to preclude free movement of said fishing line through said fishing line retaining slot.

8. A fishing float comprising:
   upper and lower portions, said upper and lower float portions being selectively connectable to one another to define a float with upper and lower ends;
   a float interior when said upper and lower float portions are connected and a selectively actuatable light member mounted within said float interior;
   a fishing line opening at each of said upper and lower ends;
   a hollow spring support at the lower end of said lower float portion and a fishing line retaining slot in said spring support, said fishing line opening at said lower end being in communication with said hollow spring support; and
   a spring mounted on said spring support, said spring being located at a single position on said spring support and is moveable between a compressed position which permits a fishing line to be inserted into said fishing line retaining slot and an extended position in which said spring extends completely past said fishing line retaining slot to preclude free movement of said fishing line through said fishing line retaining slot.

9. A combination lighted, center slide slip/spring float comprising:
   an upper float portion and a lower float portion, said upper and lower float portions being selectively connectable to one another to define a float with upper and lower ends;
   a spring support at said lower end and a fishing line receiving slot in said spring support;
   a spring mounted on said spring support;
   a substantially hollow float interior when said upper and lower float portions are connected with one another;
   a light mounting member positioned entirely within said hollow float interior for receiving a selectively and manually actuatable light member;
   a selectively and manually actuatable light member mounted in said light mounting member; and
   a fishing line opening extending from said upper end through said float interior and said spring support and to said lower end to allow a fishing line to pass through said fishing line opening.

10. The fishing float of claim 9 including a light mounting member connected with one of said upper and lower portions wherein said light member is mountable to said light mounting member.

11. The fishing float of claim 10 wherein said light mounting member includes a mounting disc having a central opening and one or more light receiving openings spaced from said central opening.

12. The fishing float of claim 11 including a hollow tubular stem extending through said central opening when said upper and lower float portions are connected.

13. The fishing float of claim 12 wherein said hollow tubular stem includes an upper end aligned with said fishing line opening in said upper float portion.

14. The fishing float of claim 9 wherein said spring is located at a single position on said spring support and is moveable between a compressed position which permits a fishing line to be inserted into said fishing line retaining slot and an extended position in which said spring extends completely past said fishing line retaining slot to preclude free movement of said fishing line through said fishing line retaining slot.

15. A combination slip/spring fishing float comprising:
   selectively detectable and attachable top and bottom float portions which, when attached, form a float having a top end and a bottom end;
   a hollow spring support extending from said bottom float portion at said bottom end, said spring support having a side wall;
   a spring mounted on said spring support and extending along a portion of said spring support;
   a fishing line receiving slot in said side wall of said spring support, said slot being positioned in the portion of said spring support along which said spring extends;
   a fishing line receiving opening extending from said top end, to said bottom and through said hollow spring support; and
   a hollow center stem wherein said center stem extends outwardly from said lower end to define said hollow spring mount section and inwardly from said lower end to engage said top float portion and define at least a portion of said fishing line opening.

\* \* \* \* \*